United States Patent
Koutharapu et al.

(10) Patent No.: US 7,363,626 B2
(45) Date of Patent: Apr. 22, 2008

(54) THREAD LEVEL APPLICATION PARTITIONING

(75) Inventors: Balaji Koutharapu, Bangalore (IN); Srinivas M. Ramprasad, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 958 days.

(21) Appl. No.: 10/395,570

(22) Filed: Mar. 24, 2003

(65) Prior Publication Data

US 2004/0194093 A1 Sep. 30, 2004

(51) Int. Cl.
*G06F 9/46* (2006.01)
*G06F 15/173* (2006.01)

(52) U.S. Cl. .............. 718/105; 718/104; 709/223; 709/224; 709/225; 709/226

(58) Field of Classification Search ........ 718/100–108; 709/235, 223–226
See application file for complete search history.

(56) References Cited

U.S. PATENT DOCUMENTS

| | | | |
|---|---|---|---|
| 5,504,898 A | | 4/1996 | Klein |
| 5,752,031 A * | | 5/1998 | Cutler et al. ............... 718/103 |
| 6,182,109 B1 * | | 1/2001 | Sharma et al. ............. 718/104 |
| 6,343,309 B1 | | 1/2002 | Clarke et al. |
| 6,347,312 B1 * | | 2/2002 | Byrne et al. ................... 707/3 |
| 6,427,161 B1 * | | 7/2002 | LiVecchi ..................... 718/102 |
| 6,477,561 B1 * | | 11/2002 | Robsman ..................... 718/105 |
| 6,510,498 B1 | | 1/2003 | Holzle et al. |
| 6,687,729 B1 * | | 2/2004 | Sievert et al. .............. 718/102 |
| 6,754,690 B2 | | 6/2004 | Larson |
| 6,813,637 B2 * | | 11/2004 | Cable .......................... 709/226 |
| 6,823,515 B2 * | | 11/2004 | LiVecchi ..................... 718/105 |
| 6,842,900 B2 | | 1/2005 | Sakamoto |
| 6,941,379 B1 * | | 9/2005 | Dingsor et al. ............. 709/235 |
| 2003/0187946 A1 * | | 10/2003 | Cable .......................... 709/215 |

OTHER PUBLICATIONS

Matt Welsh, "Sandstorm HTTP Server Results," Harvard University, Nov. 1, 2000, (8 Pages).

* cited by examiner

*Primary Examiner*—Meng-Al T. An
*Assistant Examiner*—Jennifer N. To
(74) *Attorney, Agent, or Firm*—Robert C. Kowert; Meyertons, Hood, Kivlin, Kowert & Goetzel, P.C.

(57) ABSTRACT

A system and method for managing threads and thread requests in an application server. If the application is a thread-partitioned application with a request, the thread manager may determine if an application thread array for the application has less than the maximum number of threads partitioned for the application. If it does, the thread manager may retrieve a thread from the main thread pool, and assign it to the request. If it does not, the thread manager may determine if there are any free threads in an application thread array, and if there are, one of the free threads in the application thread array may be assigned to the request. If there are no free threads available in the application thread array, the request may be added to a ready queue.

28 Claims, 8 Drawing Sheets

THREAD LEVEL APPLICATION PARTITIONING

BACKGROUND OF THE INVENTION

1. Field of the Invention

This invention relates to hardware and software installation and maintenance, and more particularly to managing application threads.

2. Description of the Related Art

Computer environments may implement multiple tiers. For example, FIG. 1 shows a "three-tier" environment including a client tier, an application server tier, and a resource manager tier. An application server 101 may access the resource managers 107 and communicate with clients 115 and 117 over the Internet 113. For example, the applications 103 on the application server 101 may support browsers at each client 115 and 117. In addition, the applications 103 may access databases 111 and 109 in the resource managers 107. For example, an application from the applications 103 on the application server 101 may access database 111 using the resource manager 107 to provide information stored in the database 111 to a client 117 (e.g., a web browser on the client's computer) at the request of the client 117.

The application server 101 may assign requests from the applications 103 to threads from a main thread pool 119. Threads may be components of an application that can run independently of and concurrently with other components of the application. The thread pool 119 may have a specified maximum number of threads. Applications on the application server may use the threads on a first-come, first served basis until all of the threads are in use. If one application uses up the threads in the thread pool, other applications on the application server may suffer from a shortage of available threads.

SUMMARY

In one embodiment, an application server may manage available threads and application requests using a thread manager and a configuration file with application thread partition values set for one or more applications on the application server. For example, when a request is received from an application for a thread, the thread manager may determine if the application is a thread-partitioned application. If the application is not a thread-partitioned application, the thread manager may retrieve a thread from a main thread pool and assign the thread to the request. In one embodiment, if the application is a thread-partitioned application, the thread manager may determine if an application thread array has less than the maximum number of threads partitioned for the application (i.e., the application thread partition value). If the application thread array has fewer threads than the application thread partition value assigned to the application, the thread manager may retrieve a thread from the main thread pool and store the thread identification in the application's thread array. If there are no more available threads in the main thread pool, the thread manager may search the application thread array for a free thread and/or put the request in a ready queue.

If the application thread array did not have fewer threads than the application thread partition value assigned to the application, the thread manager may determine if there are any free threads in the application thread array. If there are free threads available in the application thread array, one of the free threads in the application thread array may be assigned to the request and marked as "busy" in the application thread array. If there are no free threads available in the application thread array, the request may be added to a ready queue. When a thread becomes free, the request in the ready queue may be assigned to the free thread.

BRIEF DESCRIPTION OF THE DRAWINGS

A better understanding of the present invention may be obtained when the following detailed description is considered in conjunction with the following drawings.

Figure 1:
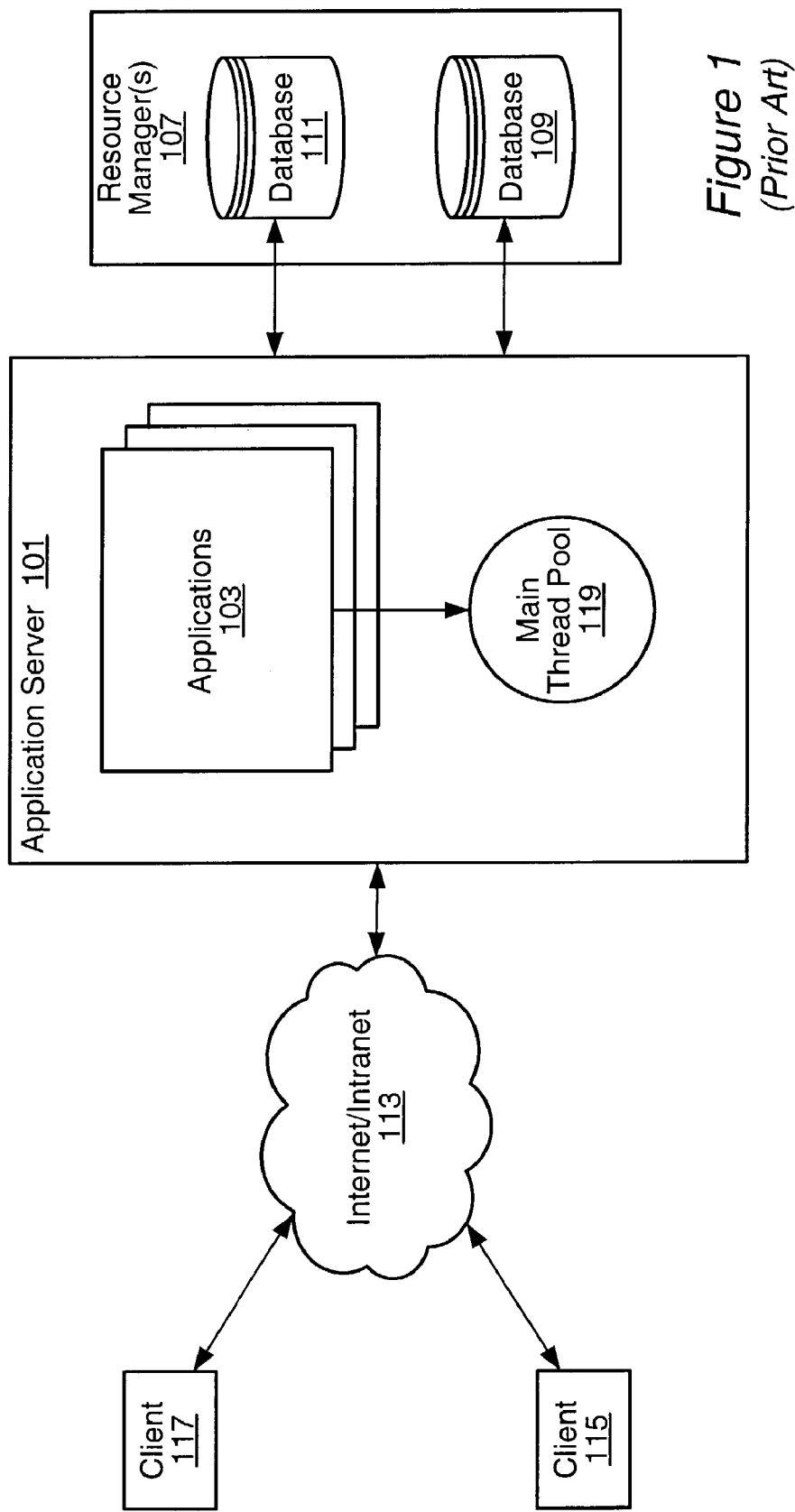
FIG. 1 shows a prior art application server with the main thread pool.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 2:
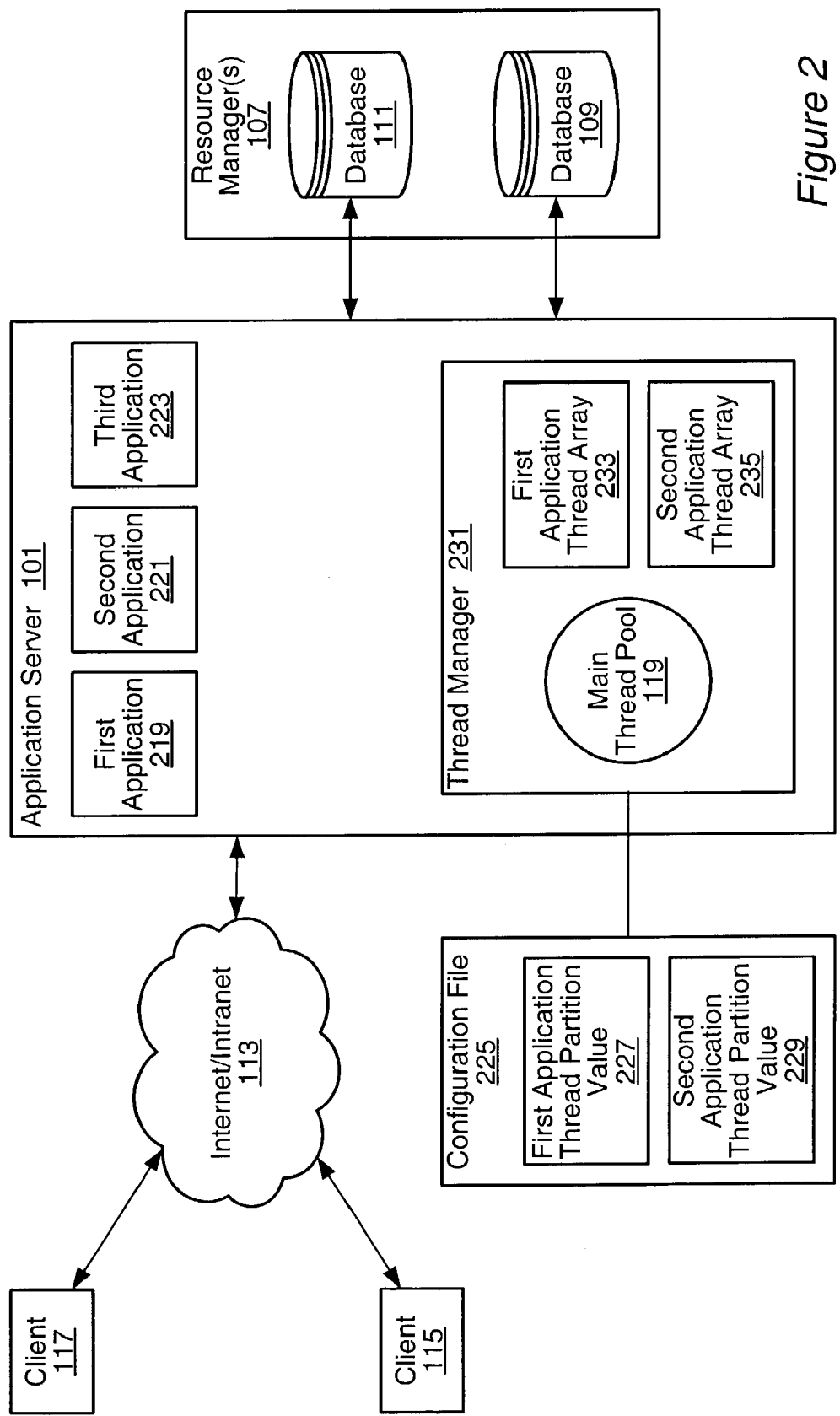
FIG. 2 shows the application server with the thread manager accessing a configuration file, according to one embodiment.

FIG. 2 illustrates an embodiment of an application server with a thread manager managing a main thread pool and several applications. In one embodiment, an application server 101 managing applications 219, 221, and 223 may implement a thread manager 231 to manage application requests for threads in the main thread pool 119. In one embodiment, the thread manager 231 may use a configuration file 225, such as, but not limited to a lightweight directory access protocol (LDAP) configuration file, to store an application thread partition value for one or more applications on the application server 101. In one embodiment, the application thread partition value for an application may be a maximum number of threads partitioned for an application on the application server 101. For example, the configuration file 225 may store a first application thread partition value 227 for a first application 219. For example, the first application thread partition value 227 may be set to ten, and the thread manager 231 may not allow the first application 219 to concurrently use more than ten threads from the main thread pool as specified in the configuration file 225. As another example, a second application thread partition value 229 may be set to five for the second application 221. In one embodiment, a third application 223 may not have an application thread partition value in the configuration file 225. In one embodiment, the first application may be designated as a thread partitioned application in the configuration file and the third application may be designated as a non-thread partitioned application in the configuration file. Other designations are also contemplated. In one embodiment, for each application that is designated as a thread partitioned application, an application thread array may be created for the application. Also, in one embodiment, the thread partitioning may be disabled, such that when the thread partitioning is disabled, threads from the main thread pool are used on a first-come, first served basis or according to some other thread allocation technique. In one embodiment, the configuration file may include a field to enable/disable the thread partitions. If the field is set to disable, the thread partitioning may be disabled.

In one embodiment, the thread manager 231 may also maintain the application thread array for one or more applications on the application server 101. For example, first application thread array 233 may comprise thread identifications and the status of each thread being used by the first application 219 on the application server 101. As another example, the second application thread array 235 may comprise thread identifications and the status of each thread being used by the second application 221. In one embodiment, an application thread array may not be maintained for an application, such as but not limited to, the third application 223. Also, in one embodiment, a separate thread array may not be maintained for the applications that are thread partitioned. For example, in one embodiment, an index may be maintained to store the number of threads being used by each application.

Figure 3:
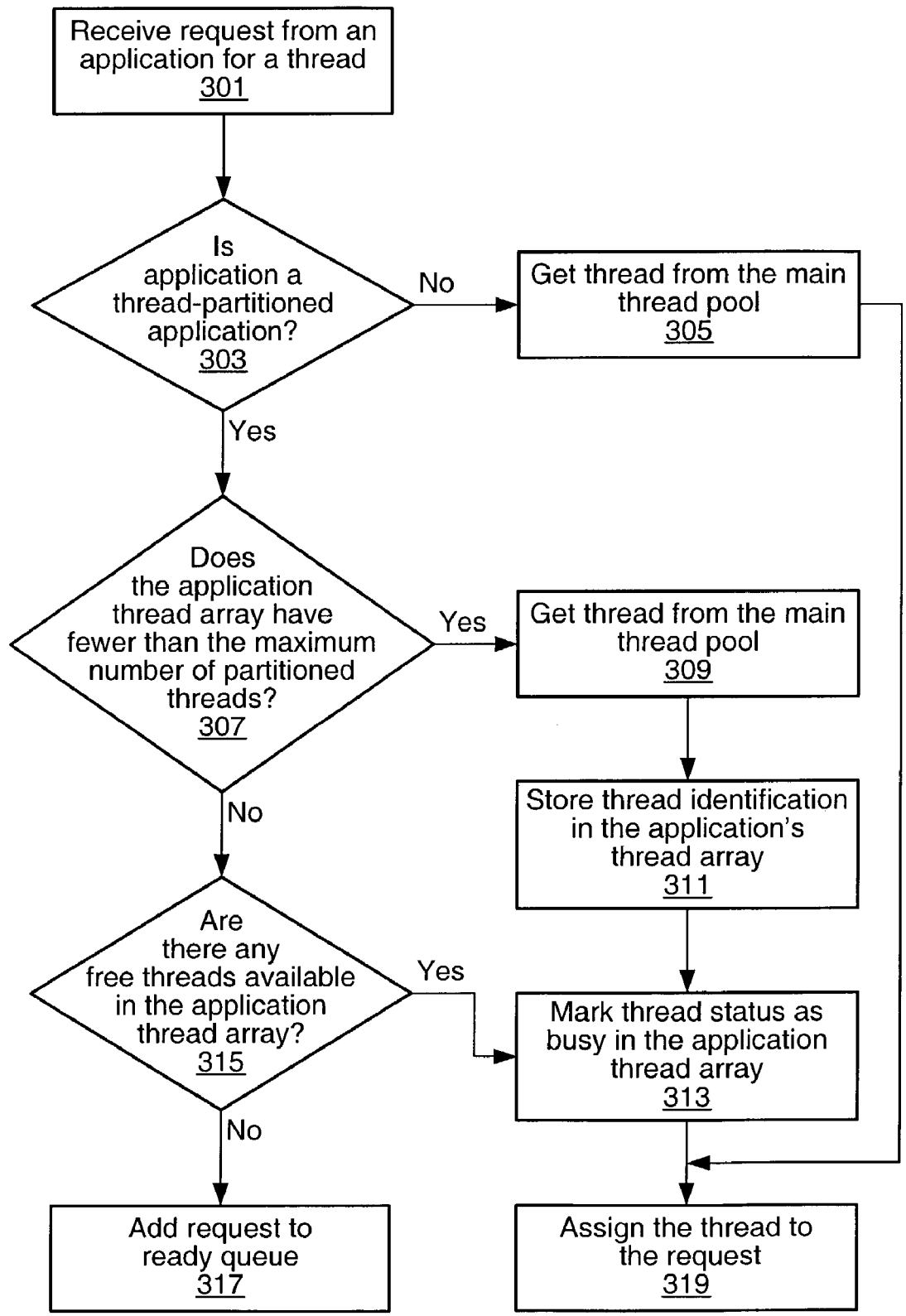
FIG. 3 shows a flowchart for assigning a thread to a request, according to one embodiment.

FIG. 3 illustrates a flowchart of an embodiment of a method for assigning a request to a thread. It should be noted that in various embodiments of the methods described below, one or more of the processes described may be performed concurrently, in a different order than shown, or may be omitted entirely. Other additional processes may also be performed as desired.

In 301, a request may be received from an application for a thread. For example, the first application 219 may request a thread from the main thread pool 119.

In 303, the thread manager on the application server may determine if the application is a thread-partitioned application. For example, in one embodiment, the thread manager may read the configuration file to determine if the application is a thread-partitioned application.

In 305, if the application is not a thread-partitioned application, the thread manager may retrieve a thread from the main thread pool. In 319, the thread may be assigned to the request. If there are no more available threads in the main thread pool, the thread manager may put the request in a ready queue.

In 307, if the application is a thread-partitioned application, the thread manager may determine if the application thread array for that application has less than the maximum number of threads partitioned for the application (e.g., the application thread partition value as specified in a configuration file). In one embodiment, the application thread partition value may be pre-determined by a system administrator and/or programmer. Other sources of the application thread partition value are also within the scope of the invention. For example, all applications in the application server may be assigned a default application thread partition value. In one embodiment, a variable, such as application thread count may be incremented each time a new thread is used by the application. The application thread count may then be compared to the application thread partition value to determine if the request can be assigned to a thread from the main thread pool.

In 309, if the application thread array has fewer threads than the application thread partition value assigned to the application, the thread manager may retrieve a thread from the main thread pool. For example, if the application thread partition value is set to ten for a first application, and the first application is currently only using five threads, the thread manager may retrieve a thread from the main thread pool to assign to the request from the application and to the application's thread array.

In 311, the thread identification may be stored in the application's thread array. The application thread array may also have other information stored about the threads in the array. In 313, if there are free threads available in the application thread array, one of the free threads in the application thread array may be assigned to the request at 319 and marked as a busy thread in the application thread array at 313.

In 315, if the application thread array did not have fewer threads than the application thread partition value assigned to the application, the thread manager may determine if there is a free thread in the application thread array.

Again, in 313, if there are free threads available in the application thread array, one of the free threads in the application thread array may be assigned to the request at 319 and marked as a busy thread in the application thread array at 313.

In 317, if there are no free threads available in the thread array, the request may be added to a ready queue. When a thread becomes free, the free thread may be assigned to the request in the ready queue.

Figure 4:
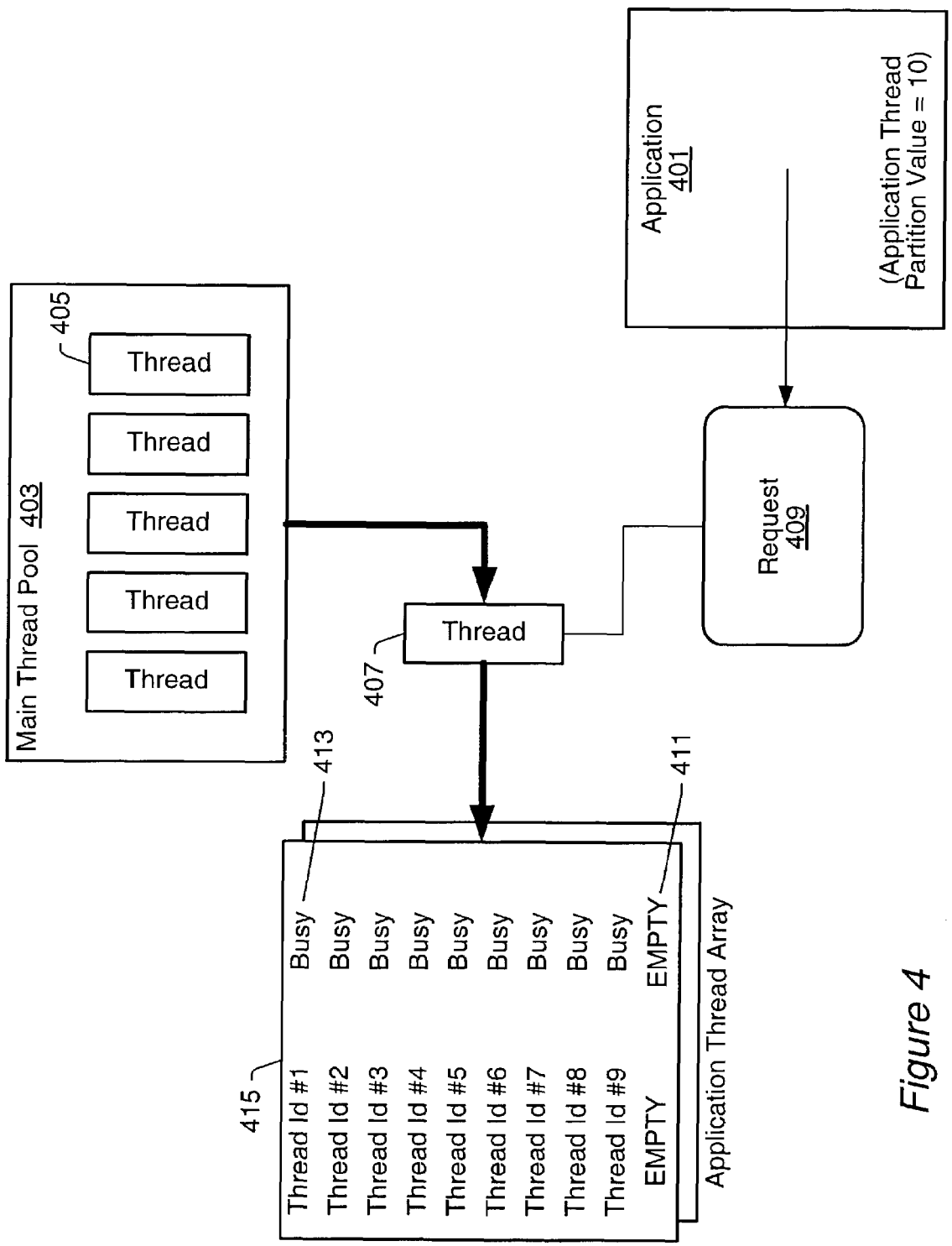
FIG. 4 shows a free thread from the main thread pool being assigned to the request, according to one embodiment.

FIG. 4 illustrates an example of a free thread from a main thread pool being assigned to a request according to one embodiment. In one embodiment, a request 409 from an application 401, with an application thread partition value equal to 10, may be received by a thread manager. In one embodiment, the application thread array 415 may be using fewer threads than the application thread partition value assigned to the application. For example, the application thread array may have an empty slot 411. In one embodiment, the application thread array may not have an empty slot 411, but may be expandable. Other embodiments of the application thread array are also contemplated.

In one embodiment, a thread 407 may be retrieved from the main thread pool 403 having other free threads such as, but not limited to, thread 405. The thread 407 may be assigned to the request 409. In one embodiment, the thread identification of the thread 407 may be added to the application thread array and a status of "busy" may be stored with the thread identification in the application thread array 415. Other statuses are also contemplated. In one embodiment, the application thread array 415 may have other threads such as, but not limited to, thread id #1 with a "busy" status 413.

Figure 5:
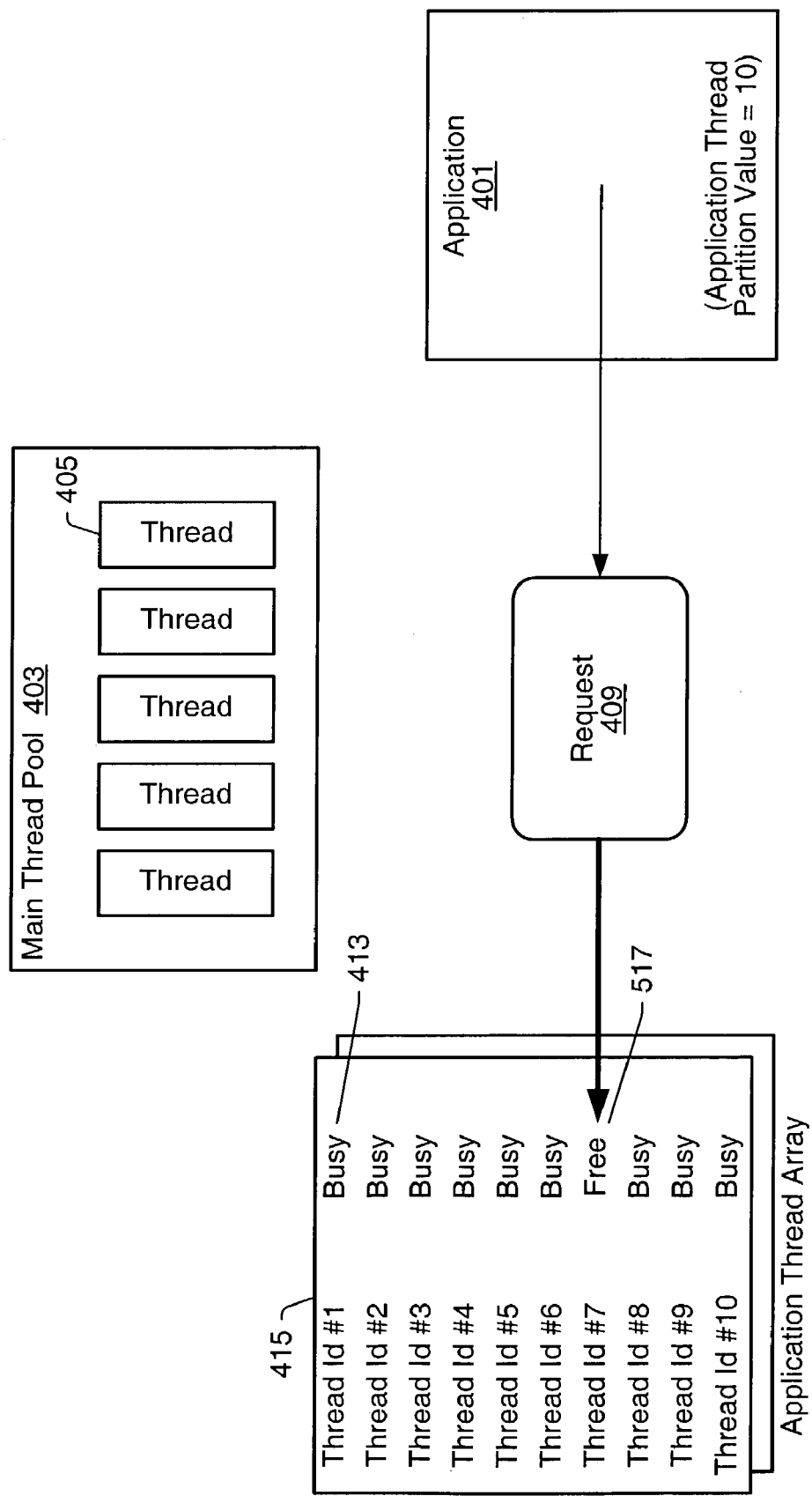
FIG. 5 shows a free thread from an application thread array being assigned to the request, according to one embodiment.

FIG. 5 illustrates an example of a free thread from an application thread array being assigned to a request. In this example, the application 401 with an application thread partition value equal to ten, may have the maximum number of threads in its thread array or specified by its application thread partition value. In one embodiment, because the application already has its application thread partition value number of threads assigned to it, the thread manager may not allow the request 409 to be assigned a thread from the main thread pool 403. The thread manager may search the application thread array for a free thread, such as, but not limited to, thread seven 517. In one embodiment, the free thread, with thread identification Thread Id #7, may be assigned to the request 409 and marked as a busy thread.

Figure 6:
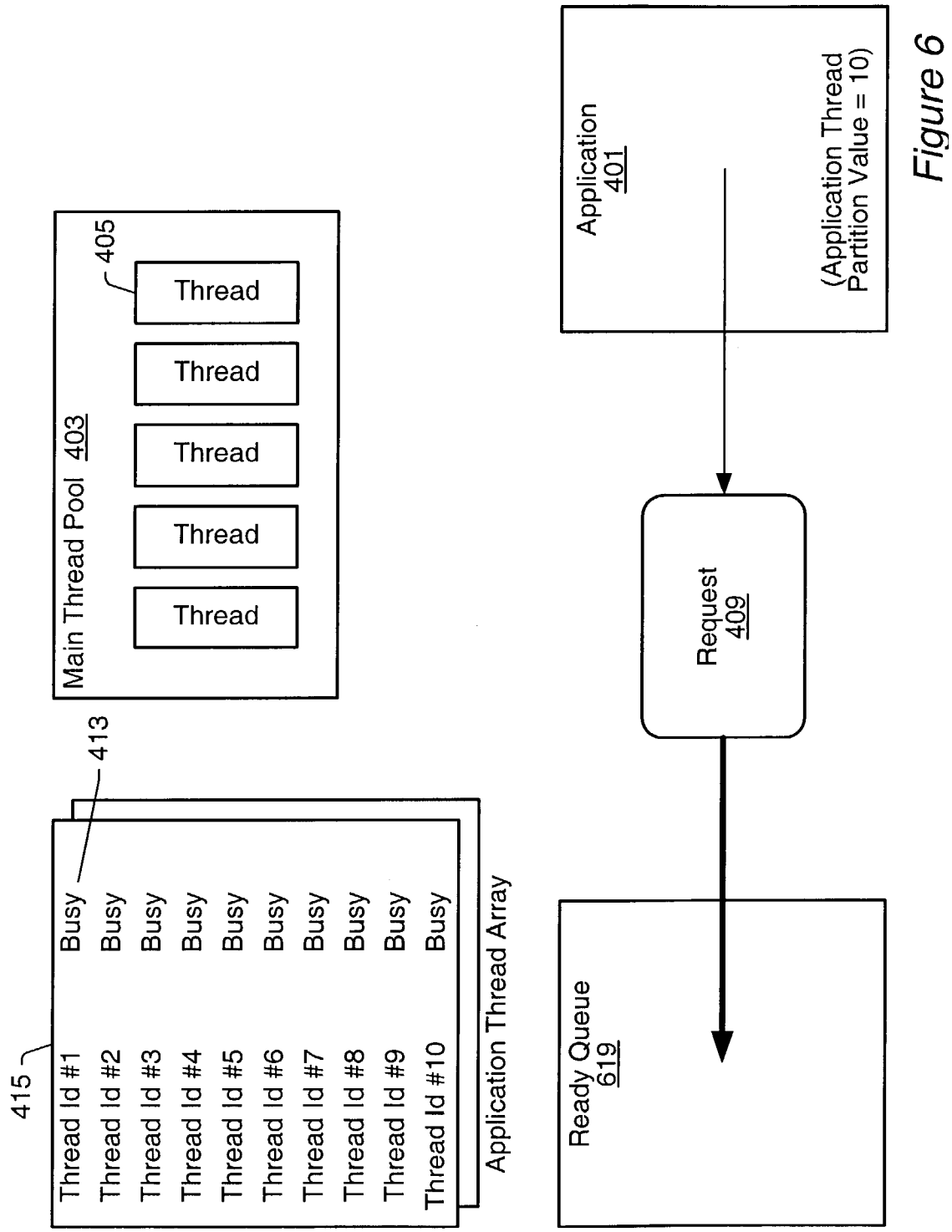
FIG. 6 shows the request being put into the ready queue, according to one embodiment.
Figure 7:
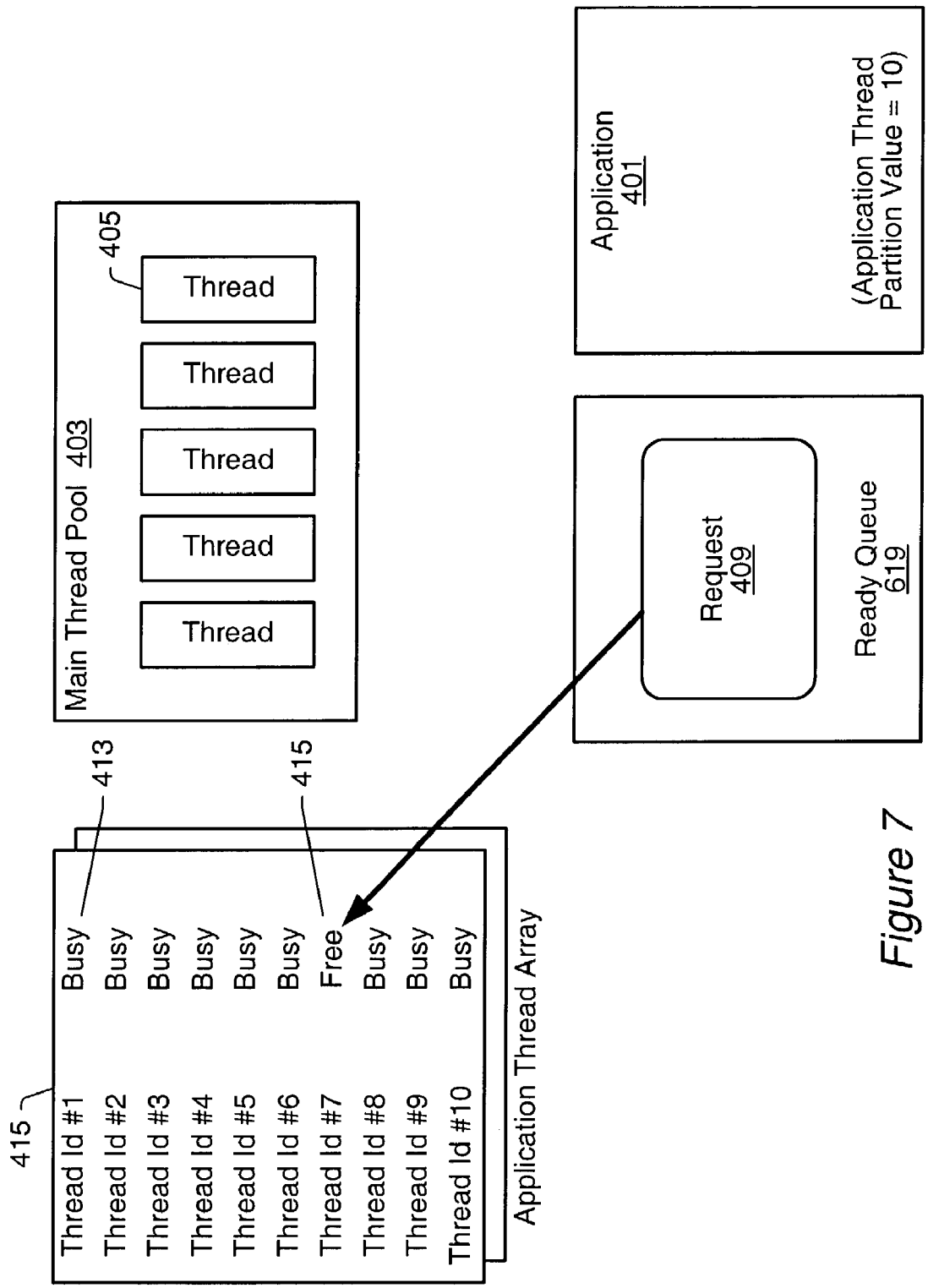
FIG. 7 shows the request from a ready queue being assigned to a free thread from the application thread array, according to one embodiment.

FIG. 6 illustrates an embodiment of a request being put into a ready queue. In one embodiment, the request 409 from the application 401 may be put into a ready queue 619 if the application 401 is not using less than the application thread partition value number of threads and all of the threads in the application thread array are busy. When a thread in the application thread array 415 becomes free, the request 409 may be assigned to the free thread and the status of the free thread in the application thread array may be marked as busy. For example, in FIG. 7, when a thread in the application thread array 415 becomes free, the request 409 may be assigned to the free thread 415 and the thread 415 may be marked as busy.

Figure 8:
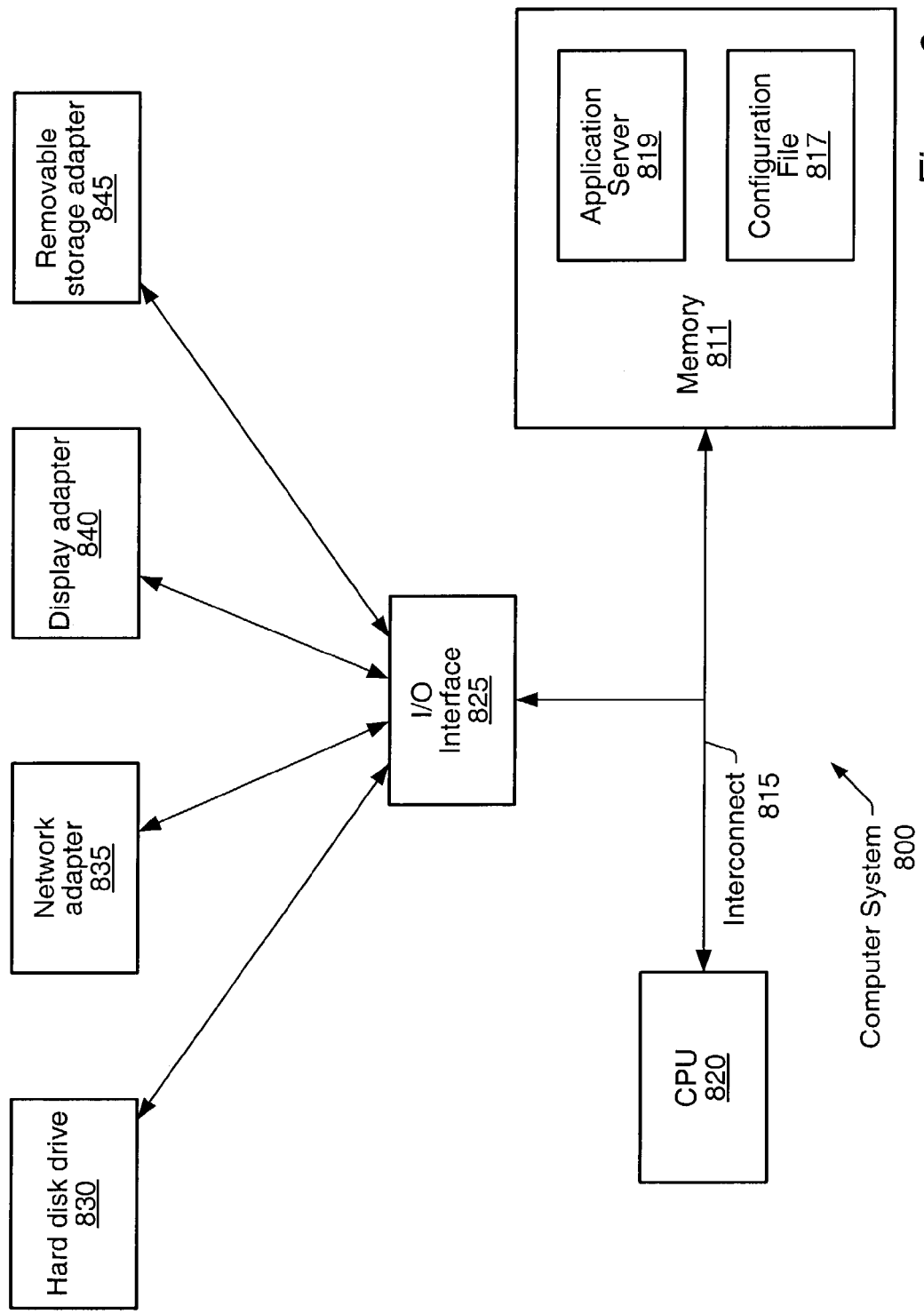
FIG. 8 shows a computer system with the application server and the configuration file for managing requests, according to one embodiment.

FIG. 8 illustrates an embodiment of a computer system with an application server and a configuration file as described above. In one embodiment, computer system 800 with a central processing unit (CPU) 820 may use a memory 811 supporting an application server 819 and configuration file 817. An input/output (I/O) interface 825 may communicatively couple a hard disk drive 830, a network adaptor 835, a display adaptor 840, and a removable storage adapter 845 to the CPU 820 through an interconnect 815. Other adapters and devices are also contemplated. Other computer architectures are contemplated.

The memory 811 may store program instructions executable by the CPU 820 to implement application thread partitioning as described herein. The following is a code example for application thread partitioning. The comments to the right of the "II" are illustrative of one embodiment of the invention. Other code may also be within the scope of the invention. Other programming languages may also be within the scope of the invention.

```
// Assign our thread to the request.
//
if (m_bThreadsPerAppEnabled && m_bKjsEngine)
// Only Execute in KJS Engine when ThreadsPerApp is Enabled.
{
        m_bAppThread = FALSE;
        if (pAdmin->CheckApp( ) == TRUE)
        {
            m_bAppThread = TRUE;
            if (m_nCfgThreads < 3) {
// Taken 3 as configured threads for some application
            int j;
            for (j=0; j<m_nCfgThreads; j++)
            {
                if (((void*)pThread ==
(m_sThreadStat[j]).pThreadAddr) &&
m_sThreadStat[j].bThreadFree) {
m_sThreadStat[j].bThreadFree=FALSE;
                            m_nThreadIndex = j;
                            break;
            }
            }
                            if(j == m_nCfgThreads) {
m_sThreadStat[m_nCfgThreads].pThreadAddr=(void*)pThread;
m_sThreadStat[m_nCfgThreads].pThreadFree=FALSE;
m_nThreadIndex = m_nCfgThreads;
m_nCfgThreads = m_nCfgThreads + 1;
            }
} else {
        int k;
        for(k=0;k<m_nCfgThreads;k++)
        {
            if (m_sThreadStat[k].bThreadFree) {
        pThread = (IGXThread *)
m_sThreadStat[k].pThreadAddr;
            m_sThreadStat[k].bThreadFree=FALSE;
```

```
                m_nThreadIndex = k;
                break;
            }
        }
        if (k==m_nCfgThreads)
        {
                GXREQUEST_MARK_READY(pAdmin);
                goto DONE_PROCESSING;
        }
    }
}
}// only execute in KJS Engine.
pAdmin->SetThread(pThread);
//
// Here some code will be executed by each thread.
//
// Request Steps.
//
pAdmin->SetThread(NULL);
// which makes the assigned thread to be back to the thread pool.
If (m_bAppThread && m_bThreadPerAppEnabled && m_bKjsEngine)
{
        m_sThreadStat(m_nThreadIndex].bThreadFree = True;
// Make it Free Thread
}
DONE_PROCESSING:
// all releases of the objects created.
The definition of CheckApp member function:
STDMETHODIMP_(BOOL)
GXRequestAdmin::CheckApp( )
{
        char context_path [1024];
        context_path [0]='\0';
        const char* app_name = context_path;
        HRESULT hr;
        IGXValList *pValListIn = (IGXValList *) m_pDataIn;
        hr =
pValListIn->GetValString("CONTEXT_PATH",
context_path, sizeof(context_path));
        if (hr == NOERROR)
            app_name = (const char *) strchr(context_path+1,'/');
        if (!app_name)
            return FALSE;
        if (!strcmp(app_name+1, "timeout_test"))
            return TRUE;
        return FALSE
}
```

Various embodiments may further include receiving or storing instructions and/or information implemented in accordance with the foregoing description upon a computer accessible medium. Suitable computer accessible media may include storage media or memory media such as magnetic or optical media, e.g., disk or CD-ROM, random access memory, or other memory, as well as transmission media or signals such as electrical, electromagnetic, or digital signals, conveyed via a communication medium such as a network and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A system, comprising:
one or more processors; and
memory coupled to the one or more processors and configured to store program instructions executable by the processor to implement:
an application server configured to:
receive a request from an application for a thread for use by the application;
in response to the request, check a main thread pool for a free thread; and
assign, as part of a thread partitioning protocol, the free thread from the main thread pool to the request from an application if a number of threads in an application thread array is less than an application thread partition value for the application;
wherein the application server is operable to disable the thread partitioning protocol, wherein if the thread partitioning protocol is disabled, the threads in the main thread pool are used on a first-come, first served basis, wherein if the thread partitioning protocol is enabled, the thread is assigned according to the thread partitioning protocol.

2. The system as recited in claim 1, wherein the application server is further configured to:
check for a free thread in the application thread array if the number of threads in the application thread array is not less than the application thread partition value for the application; and
assign the free thread from the application thread array to the request, if the free thread is found in the application thread array.

3. The system as recited in claim 2, wherein if the number of threads in the application thread array is not less than the application thread partition value for the application and there are no free threads in the application thread array, the application server is further configured to put the request in a ready queue.

4. The system as recited in claim 3, wherein the application server is further configured to assign the request in the ready queue to a free thread from the application thread array when a busy thread in the application thread array becomes free.

5. The system as recited in claim 2, wherein the application server is further configured to store a thread identification for each thread assigned to the application in the application thread array.

6. The system as recited in claim 5, wherein the application server is further configured to designate the thread identification as busy or free.

7. The system as recited in claim 1, wherein the application server is further configured to access the application thread partition value for the application from a configuration file.

8. The system as recited in claim 1, wherein the application server is further configured to store a new thread identification in the application thread array for a new thread from the main thread pool assigned to the request if the thread identification is not stored in the application thread array and number of threads in the application thread array is less than the application thread partition value.

9. The system as recited in claim 1, wherein the application server is further configured to access information about the application in a lightweight directory access protocol file.

10. The system as recited in claim 9, wherein the information includes the application thread partition value assigned to the application.

11. The system as recited in claim 9, wherein the information further includes whether an application is a thread partitioned application.

12. A method, comprising:
receiving a request from an application for a thread for use by the application;
in response to the request, checking a main thread pool for a free thread;
determining if an application thread array has less threads than an application thread partition value for the application;
if a number of threads assigned to the application is less than the application thread partition value for the application, assigning the free thread from the main thread pool to the request;
wherein assigninig the free thread to the request is part of a thread partitioning protocol performed when the thread partitioning protocol enabled; and
when the thread partitioning is not enabled, assigning threads from the main thread pool on a first-come, first-serve basis.

13. The method as recited in claim 12, further comprising:
if the number of threads assigned to the application is not less than the application thread partition value for the application:
checking the application thread array for a free thread; and
if the application thread array has the free thread, assigning the free thread to the request.

14. The method as recited in claim 13, further comprising if there are no free threads in the application thread array, putting the request in a ready queue.

15. The method as recited in claim 13, further comprising if the free thread from the application thread array is assigned to the request, identifying the free thread as busy in the application thread array.

16. The method as recited in claim 13, wherein determining if the number of threads assigned to the application is not less than the application thread partition value for the application includes determining a number of thread identifications stored in the application thread array.

17. The method as recited in claim 13, further comprising determining if the request is from an application that is not thread partitioned.

18. The method as recited in claim 12, wherein if the free thread from the main thread pool is assigned to the request, storing a thread identification of the free thread in the application thread array for the application.

19. The method as recited in claim 12, further comprising maintaining information about the application in a lightweight directory access protocol.

20. The method as recited in claim 19, wherein the information includes the application thread partition value assigned to the application.

21. A computer accessible storage medium, comprising program instructions, wherein the program instructions are computer-executable to:
receive a request from an application for a thread for use by the application;

determine if an application thread array has less threads than an application thread partition value for the application;

if a number of threads assigned to the application is less than the application thread partition value for the application, assign a thread from a main thread pool to the request;

if the number of threads assigned to the application is not less than the application thread partition value for the application:
  check the application thread array for a free thread; and
  if the application thread array has the free thread, assign the free thread to the request;

wherein the program instructions for determining if the application thread array has less threads than the application thread partition value for the application and assigning a thread from a main thread pool to the request is part of a thread partitioning protocol, wherein the program instructions are further executable to perform the thread partitioning protocol if the thread partitioning protocol is enabled, wherein if the thread partitioning protocol is disabled, the program instructions are executable to assign threads from the main thread pool on a first-come, first-serve basis.

22. The computer accessible storage medium as recited in claim 21, wherein the program instructions are further executable to put the request in a ready queue if there are no free threads in the application thread array.

23. The computer accessible storage medium as recited in claim 21, wherein die program instructions are further executable to identify the free thread as busy in the application thread array if the free thread from the application thread array is assigned to the request.

24. The computer accessible storage medium as recited in claim 23, wherein the program instructions are further executable to store a thread identification of the free thread in the application thread array for the application if the free thread from the main thread pool is assigned to the request.

25. The computer accessible storage medium as recited in claim 21, wherein the program instructions are further executable to determine a number of thread identifications stored in the application thread array to determine if the number of threads assigned to the application is not less than the application thread partition value for the application.

26. The computer accessible storage medium as recited in claim 21, wherein the program instructions are further executable to maintain information about the application in a lightweight directory access protocol.

27. The computer accessible storage medium as recited in claim 26, wherein the information includes the application thread partition value assigned to the application.

28. The computer accessible storage medium as recited in claim 23, wherein the program instructions are further executable to determine if the request is from an application that is not thread partitioned.

* * * * *